United States Patent
Jang et al.

(10) Patent No.: US 6,827,368 B2
(45) Date of Patent: Dec. 7, 2004

(54) SIDE AIRBAG FOR AUTOMOBILE AND METHOD OF FOLDING THE SAME

(75) Inventors: Myun-reun Jang, Suwon-shi (KR); Hyun-joong Lee, Sungnam-shi (KR); Jin-soo Jang, Wonju-shi (KR)

(73) Assignee: Delphi Automotive Systems Sungwoo Corporation, Seoul (KR)

( * ) Notice: Subject to any disclaimer, the term of this patent is extended or adjusted under 35 U.S.C. 154(b) by 18 days.

(21) Appl. No.: 10/090,469

(22) Filed: Mar. 4, 2002

(65) Prior Publication Data

US 2003/0006587 A1 Jan. 9, 2003

(30) Foreign Application Priority Data

Jul. 3, 2001 (KR) .................................... 2001-0039505
Nov. 12, 2001 (KR) .................................... 2001-0070227

(51) Int. Cl.⁷ ............................................. B60R 21/24
(52) U.S. Cl. ..................................... 280/729; 280/743.1
(58) Field of Search .......................... 280/730.1, 730.2, 280/729, 743.1, 743.2, 740, 742

(56) References Cited

U.S. PATENT DOCUMENTS

| | | | |
|---|---|---|---|
| 5,348,342 A | 9/1994 | Haland et al. | |
| 5,752,715 A | 5/1998 | Pripps et al. | |
| 5,884,939 A | 3/1999 | Yamaji et al. | |
| 5,944,342 A * | 8/1999 | White et al. | 280/729 |
| 6,062,594 A * | 5/2000 | Asano et al. | 280/730.2 |
| 6,106,004 A * | 8/2000 | Heinz et al. | 280/729 |
| 6,199,898 B1 * | 3/2001 | Masuda et al. | 280/730.2 |
| 6,270,113 B1 * | 8/2001 | Wipasuramonton et al. | 280/730.2 |
| 6,273,456 B1 * | 8/2001 | Heigl | 280/730.2 |
| 6,279,944 B1 * | 8/2001 | Wipasuramonton et al. | 280/730.2 |
| 6,371,518 B1 * | 4/2002 | Kalandek et al. | 280/743.1 |
| 6,478,329 B1 * | 11/2002 | Yokoyama | 280/729 |

* cited by examiner

Primary Examiner—David R. Dunn
(74) Attorney, Agent, or Firm—Fish & Richardson P.C.

(57) ABSTRACT

There is provided a side airbag for an automobile having airbag modules 100, 200, 300, which selectively includes reinforcing pads, an inner cushion pad, a tube-type tether and a tear seam, all of which are piled in multi-layers, so that the side airbag may be developed with regulating the gas pressure duration without eccentricity, in a useful and effective manner to successfully protect a driver and passengers seated in the vehicle. The cushion pads used in the side airbag require a small amount of materials, are easily seamed and easily folded, so as to reduce costs.

11 Claims, 20 Drawing Sheets

SIDE AIRBAG FOR AUTOMOBILE AND METHOD OF FOLDING THE SAME

BACKGROUND OF THE INVENTION

1. Technical field

The present invention relates to a side airbag, and more particularly to a side airbag for an automobile, which stably operates by regulating gas flow and time, and a method of folding the side airbag for an automobile.

2. Description of the Prior Art

Generally, an airbag for an automobile is a security system for protecting a driver and passengers when the automobile is collided at its front or side or rolls over.

Such an airbag system may be classified based on its mounting position into a front airbag system mounted on a steering wheel or a dashboard, a side airbag system mounted to a side of a chair to protect people against a side collision of the automobile, a rollover airbag curtain system which operates when the automobile rolls over, and a knee bolster airbag system and a foot airbag system for protecting the knee or the feet. At this time, the airbag is also classified in more detail into a DAB (Driver side Air Bag) and a PAB (Passenger side Air Bag).

Recently, the airbag has a dual-chamber structure so as to minimize the punch-out force transmitted to a user when the cushion is developed.

The dual-chamber structure of the prior art may be found in U.S. Pat. No. 3,799,575 under title the "Protective device for vehicular passengers incorporating silencing apparatus", as shown in FIG. 1.

Such a protective device, recognized as an original technique of applying the dual chamber structure to a side airbag, includes an inner inflatable bag 2 separately mounted in an airbag cushion 1, a screen 8 fixed at an inner side of the inner inflating bag 2 and having a perforated hole, and a storage chamber 3 for discharging compressed and combustible gas or predetermined fluid into a porous area 1' of the cushion 1 and the inner inflatable bag 2 by combining an explosion-release plug 4 to a manifold conduit 5 having jet port openings 6, 6', 6".

This protective device has a regulation function of gas extrusion by collecting heat transferred and fluid flowed according to inflation of the airbag cushion into the screen 8 and the inner inflatable bag 2, and the function of regulating direction of the gas flow injected from the manifold conduit 5 by the screen 8, hereinafter referred to as a gas flow orienting function.

On the other hand, as another example in applying the dual chamber structure to a front airbag, U.S. Pat. No. 5,573,270, discloses an airbag having an inflating gas diffuser with a gas release inflator.

In this patent, it is attempted to seam the inner texture performing the same role as the inflating gas diffuser suitably to an inside of the cushion, and therefore regulating the gas flow of the inflator. The inner texture is comprised of seamed portions and a non-seamed portion, so as to use the gas extrusion regulating function without any perforated hole. In other words, the inner texture makes the gas flowing radially passing through the non-seamed portion between the seamed portions so as to restrain release of the gas.

In the above airbag, because the warp threads and woof of the cushion texture are oriented to same directions as those of the inner texture, the gas may have relatively more smooth linear flow. However, if such a technique is applied to a side airbag having a dual chamber structure for protecting the thorax and the head of a driver, it is very difficult to reconfigure the gas flow.

In this example, the warp thread is a thread in a longitudinal direction (weaving direction) with the texture, and becomes more twisted than the woof. On the other hand, the woof is a thread in a horizontal direction of the texture crossed with the warp thread at a right angle, and it is generally thicker and less twisted than the warp thread. Therefore, the airbag cushion and the inner texture consisting of the warp threads and the woof have fine slit lines in a longitudinal direction (weaving direction), so the gas direct flow is developed to the longitudinal direction.

There is an example of applying the gas flow orienting technique to the side airbag in found U.S. Pat. No. 5,562,506.

As shown in FIGS. 2 and 3, the side airbag 10 includes a cushion 11 having a pocket-like shape in a specific cloth material so that gas may flow inside 11' thereof for a predetermined time, a section chamber 13 positioned at a side of the cushion 11, and an inflator 12 installed in the section chamber 13 to generate gas from a release hole 15 according to the ignition signal of a sensor controller, not shown, so that the cushion 11 can be inflated to a predetermined size.

In such a configuration, the cushion 11 and the section chamber 13, which are made by folding one texture in a loop, are sewed by multiple lot of seam lines 19a to 19d. The section chamber 13 has a first hole 14 at a side toward the cushion 11 and a second hole 17 at an opposite side. Stud bolts 16 of the inflator 12 are screwed by bolts through the second hole 17 and a third hole 18, formed at an opposite end of the cushion 11 out of the section chamber 13.

An operating method of the side airbag is as follows. If an automobile having the airbag 10 is in a collision, the inflator 12 installed in the section chamber 13 of the cushion 11 is ignited with an ignition signal from the sensor controller not-shown, the gas is released into the inside 11' of the cushion 11 through the release hole 15 and the first hole 14, and then the cushion 11 is finally developed to protect a side portion of the rider.

FIGS. 4 and 5 are another side airbag 20 of the prior art, disclosed in PCT Publication No. WO 00-20260, which include a cushion 24, in which a lower chamber 22 and an upper chamber 24 are separately formed, and an inflator 26 formed at a lower side of the cushion 24 to supply gas into the lower chamber 22.

The lower chamber 22 has a plurality of discharge holes 27 at an upper side to discharge gas toward the cushion 24. Also, at a lower side of the lower chamber 22, there is provided a flow-changing member 28 in a tube shape wrapping around the inflator 26 for generating gas so as to store the gas therein and move the stored gas to be supplied to a vertical direction.

Seeing operation of the side airbag 20 as constructed above, if there is a collision at a side of the vehicle, a sensing device, not shown, detects the collision and transmits an electric signal to the inflator 26, and the inflator 26 receiving the electric signal then supplies gas by explosion.

The gas supplied from the inflator 26 then changes direction by striking the flow changing member 28, inflating the right side of the lower chamber 22 at first, then flowing upward after inflating the left side, and then passing through the discharge hole 27 of the lower chamber 22 inflating the upper chamber 23.

However, though the protective device for passengers shown in FIG. 1 has a dual chamber structure, in that the inner inflatable bag 2 is mounted in the airbag cushion 1, it is not configured to protect the thorax and the heat at the same time, so it is difficult to effectively and safely protect the passengers.

As for the side airbag 10 shown in FIGS. 2 and 3, because the gas is discharged from the inflator 12 directly to the inside 11' of the cushion 11, the punch-out force generated when the cushion 11 is developed is directly transmitted to the user, so there is a drawback that it cannot ensure enough safety of the user.

In case of the side airbag 20 shown in FIGS. 4 and 5, because the lower chamber 22 is not uniformly inflated due to the flow-changing member 28 in the lower chamber 22 and at the same time the upper chamber 23 turns around during punching out, that is, generates bag rotation, there are shortcomings that the airbag cannot be developed stably while standing up, the head of the user may slide in contact with the upper chamber 23 unstably, and it is difficult to regulate the speed of the developing upper chamber.

In addition, because the lower chamber of the prior art has a texture which is weaved to one direction, the ratio of gas that escape through the cloth is relatively high. That is, the conventional side airbag has a relatively high permeability, so the pressure in the airbag cannot be maintained for a long time.

Moreover, because the upper chamber is inflated after the lower chamber, there may be too much interaction between the upper and lower chambers and therefore there is high probability of unstable development.

SUMMARY OF THE INVENTION

The present invention is designed to overcome such drawbacks and shortcomings of the prior art, and an object of the present invention is to provide a side airbag for an automobile and its folding method, in which a cushion may be developed with in a set time without the eccentricity, and effectively protect a driver and passengers in the vehicle.

Another object of the present invention is to provide a side airbag for an automobile and its folding method, which may stably develop a second chamber by folding the second chamber to be inwardly depressed and then folding it compactly.

Still another object of the present invention is to provide a side airbag for an automobile and its folding method, in which gas is supplied inside a center chamber formed in a tube-type tether, and the gas of the center chamber flows in the first and second chamber positioned above and below the center chamber, so that the cushion may be stably developed without being twisted.

In order to accomplish the above object, the present invention provides a side airbag for an automobile installed to the side of a chair back of an automobile and having an inflator, which supplies gas by explosion upon receiving a signal through an electric wire when the automobile crashes, in which the side airbag includes a first airbag module including first and second cushion pads having extensions with a plurality of insert holes on one side and combined each other to form a second chamber for filling gas therein, and an inner cushion pad, which is folded in a half size to form a first chamber between the first and second cushion pads and has a plurality of first gas exhaust holes formed upward thereon and an inflator-mounting portion which is added to the extensions; and an inflator module including a fixing member having first and second mounting holes into which both sides of the inflator are inserted, the fixing member fixing the first airbag module to an inside of the side of the chair back by inserting outwardly protruded screws thereof into the insert holes of the first and second cushion pads and into an insert hole of the inner cushion pad.

In order to obtain the above object of the present invention, the present invention further provides a method of folding a side airbag for an automobile, which includes the steps of folding ends of first and second pads, positioned at an opposite side to an inner cushion pad, to a position near a cushion seam line; folding right portions of the first and second folded cushion pads to the left so that an upper side of an inflator-mounting portion becomes perpendicular to the right side of the right portion; folding left portions of the first and second folded cushion pads to the right to be partially overlap with the right portion so that the upper side of the inflator-mounting portion becomes perpendicular to a left side of the left portion; folding lower portions of the first and second cushion pads upward so that a lower side of the lower portion becomes substantially parallel to the upper side of the inflator-mounting portion, so making the first airbag module folded in a rectangular shape; and partitioning the first airbag module into three sections to be folded so that the first airbag module has a size identical to a finally folded section.

In order to perform the above object of the present invention, there is also provided a side airbag for an automobile installed to the side of a chair back of the automobile having an inflator which supplies gas by explosion up on receiving signal through an electric wire when the automobile crashes, in which the side airbag includes a second airbag module, which also includes third cushion pads for forming a first chamber, to an inflator-mounting portion of which reinforcing pads are attached along a seam line for heat-blocking and structural reinforcement, the third cushion pads having a tear seam at the center thereof, and a fourth cushion pad to form a second chamber by seaming both ends to combine the lines marked at a center of the third cushion pad and then seaming an outer seam line, wherein the second airbag module is folded by folding the fourth cushion pad in advance to be arranged in the first chamber, and then piling the third cushion pad and seaming the third cushion pad along seam lines so that the inflator-mounting portion is opened.

In order to achieve the above object, the present invention also further provides a side airbag for an automobile installed to a side of a chair back of the automobile and having an inflator which supplies by explosion gas on the receipt of a signal through an electric wire when the automobile crashes, which side airbag includes a third airbag module, which also includes fifth and sixth cushion pads having lateral tether-attaching portions at inner centers thereof; and a tube-type tether seamed at the tether-attaching portions to form a center chamber, wherein the tube-type tether forms a plurality of gas exhaust holes and a passage so that the third airbag module supplies from a center thereof to a lower first chamber and an upper second chamber, respectively.

BRIEF DESCRIPTION OF THE DRAWINGS

These and other features, aspects, and advantages of the present invention will become better understood with regard to the following description, appended claims, and accompanying drawings, in which like components are referred to by like reference numerals. In the drawings:

DETAILED DESCRIPTION OF THE PREFERRED EMBODIMENT

Hereinafter, preferred embodiments of the present invention will be described in detail with reference to the accompanying drawings.

First Embodiment

Figure 1:
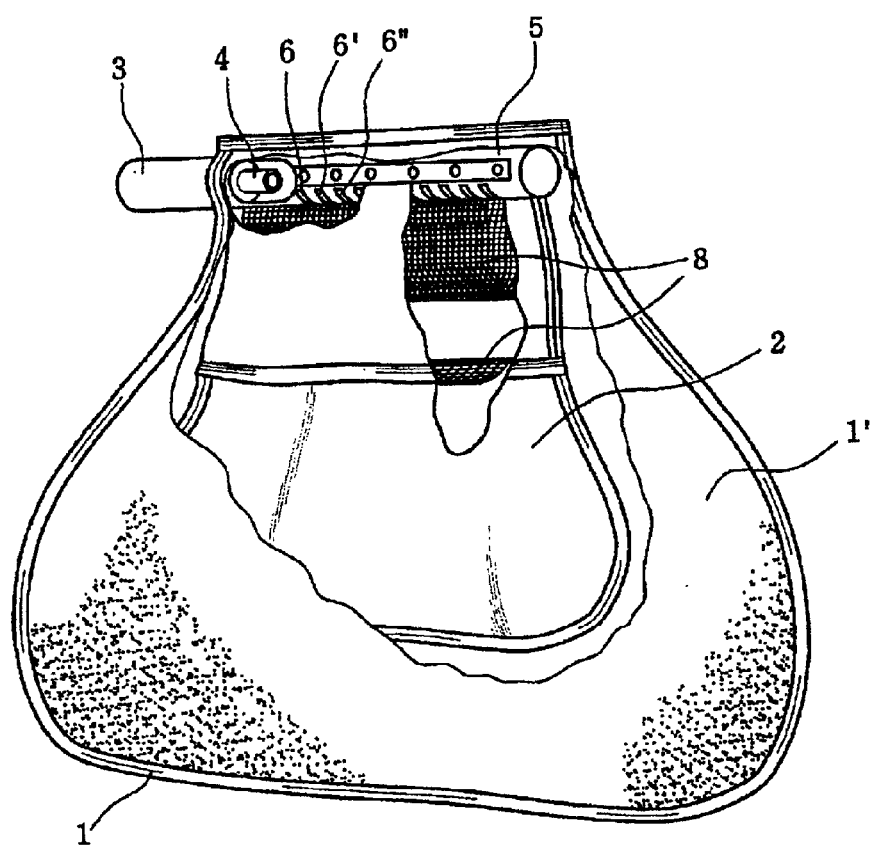
FIG. 1 is a partially-cut perspective view for illustrating the configuration of a side airbag according to the prior art.
Figure 2:
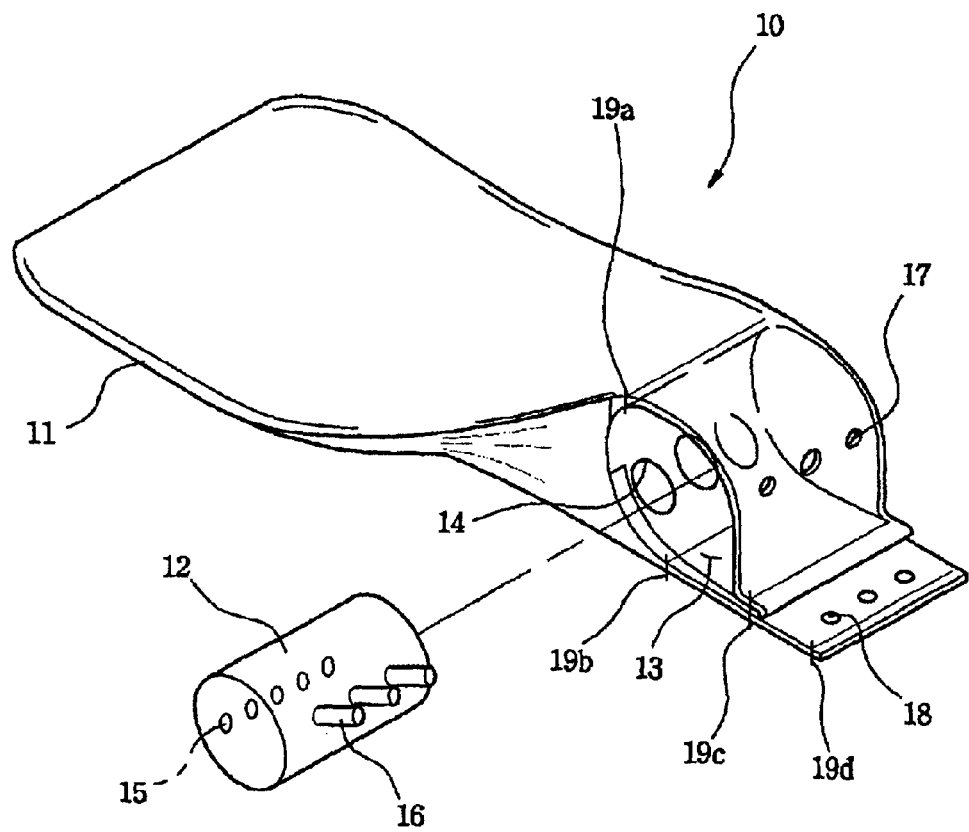
FIG. 2 is a perspective view showing another kind of side airbag according to the prior art.
Figure 3:
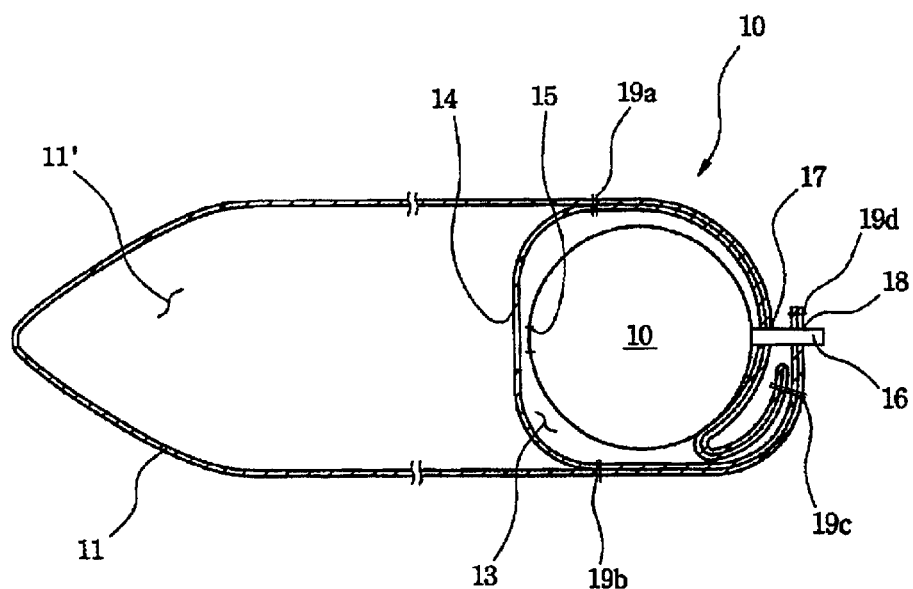
FIG. 3 is a side sectional view showing the side airbag of FIG. 2.
Figure 4:
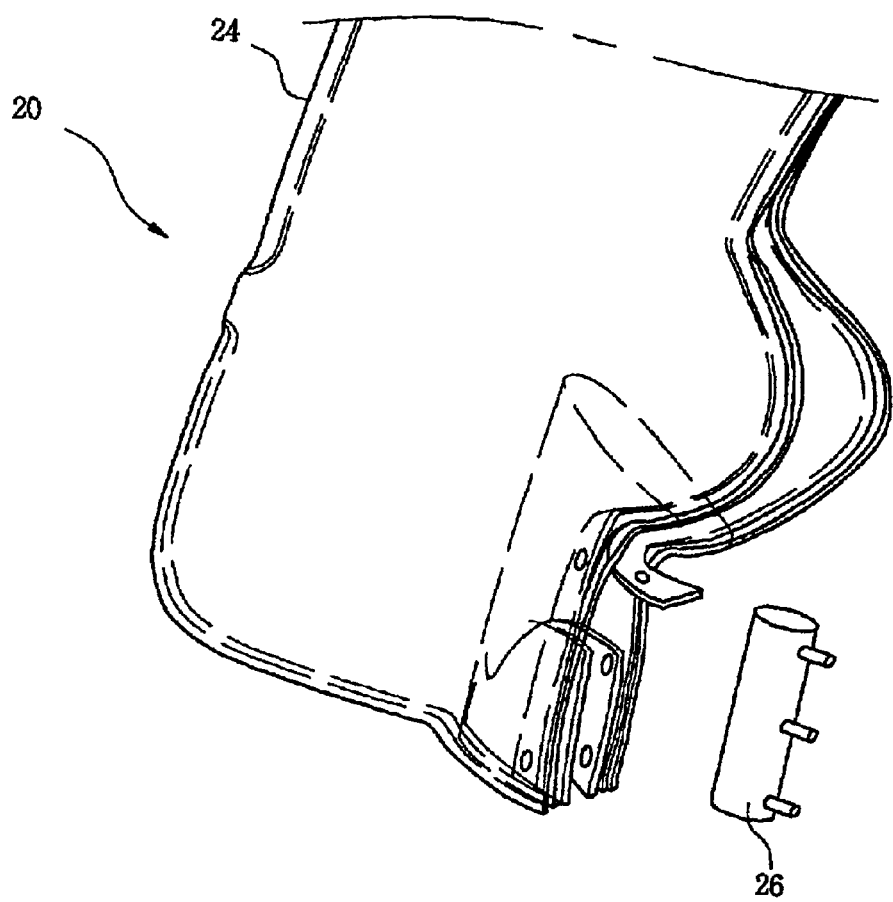
FIG. 4 is a perspective view showing still another kind of side airbag according to the prior art.
Figure 5:
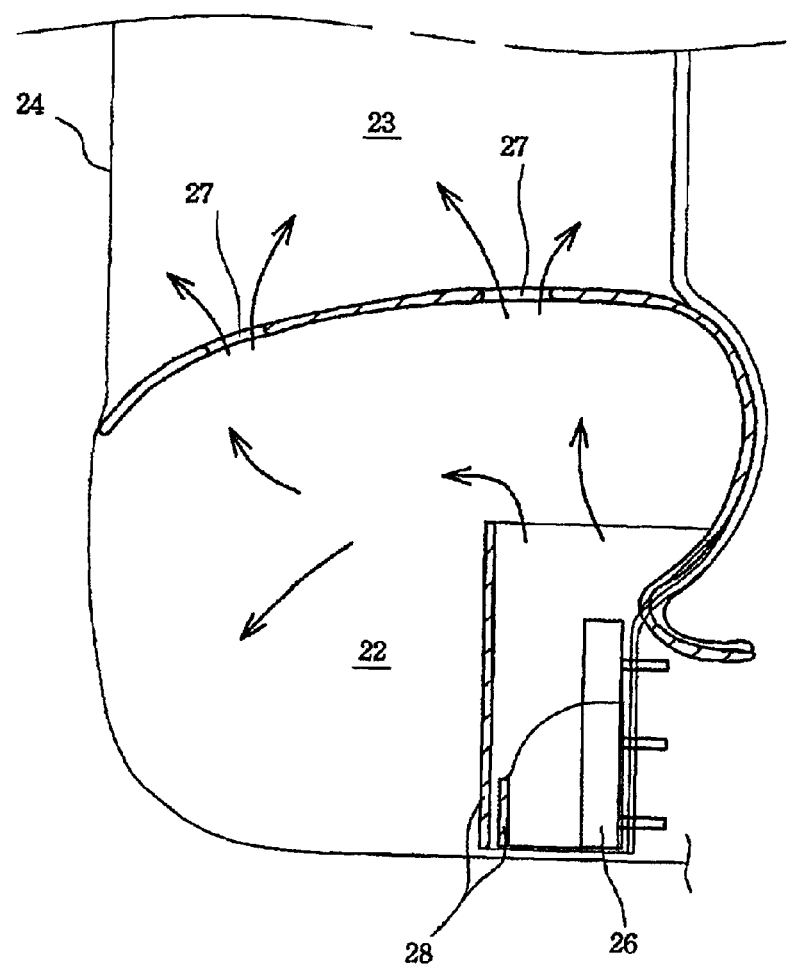
FIG. 5 is a side sectional view showing the side airbag shown in FIG. 4.
Figure 6:
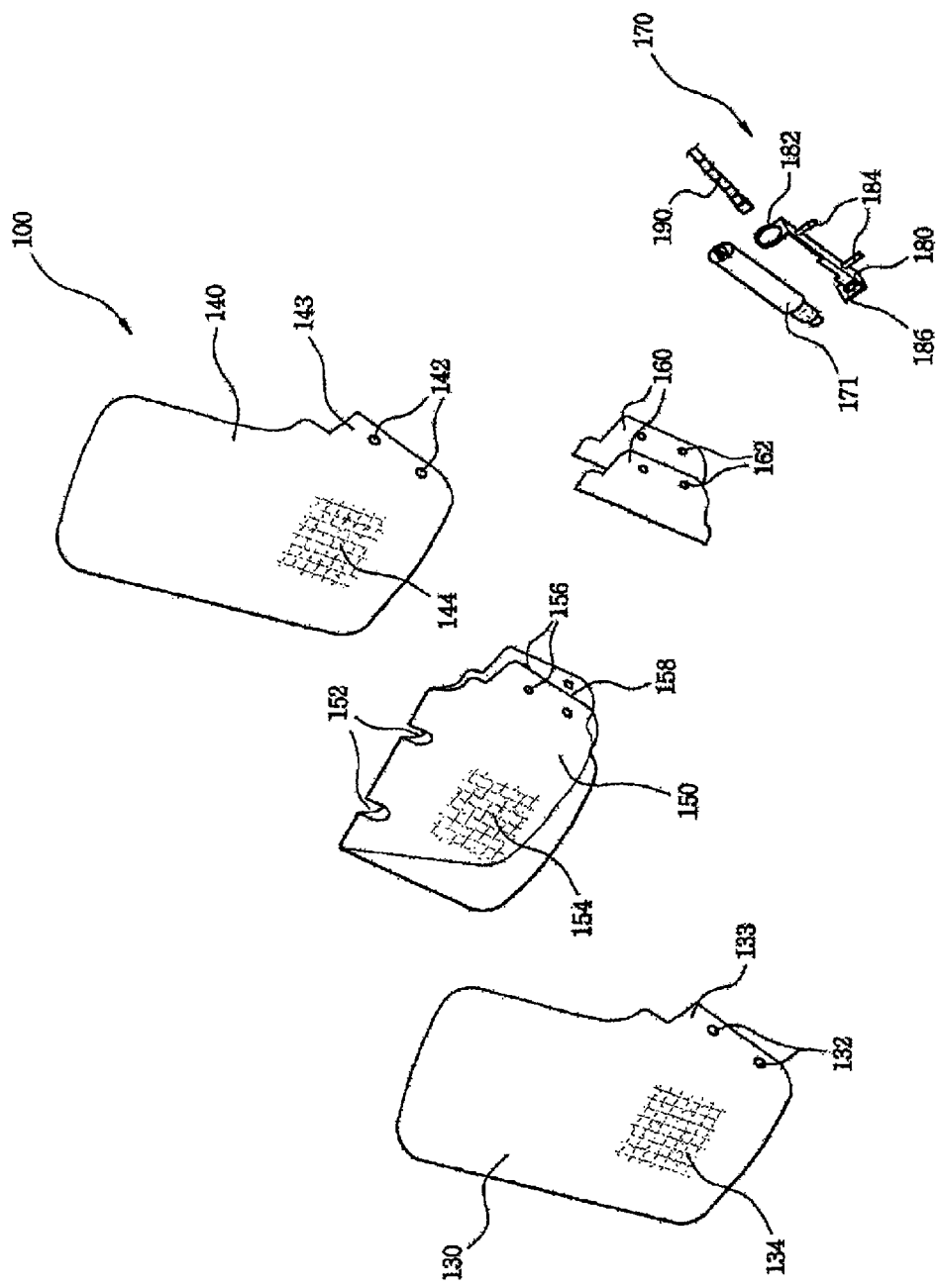
FIG. 6 is an exploded perspective view showing a side airbag for an automobile according to one embodiment of the present invention.
Figure 7:
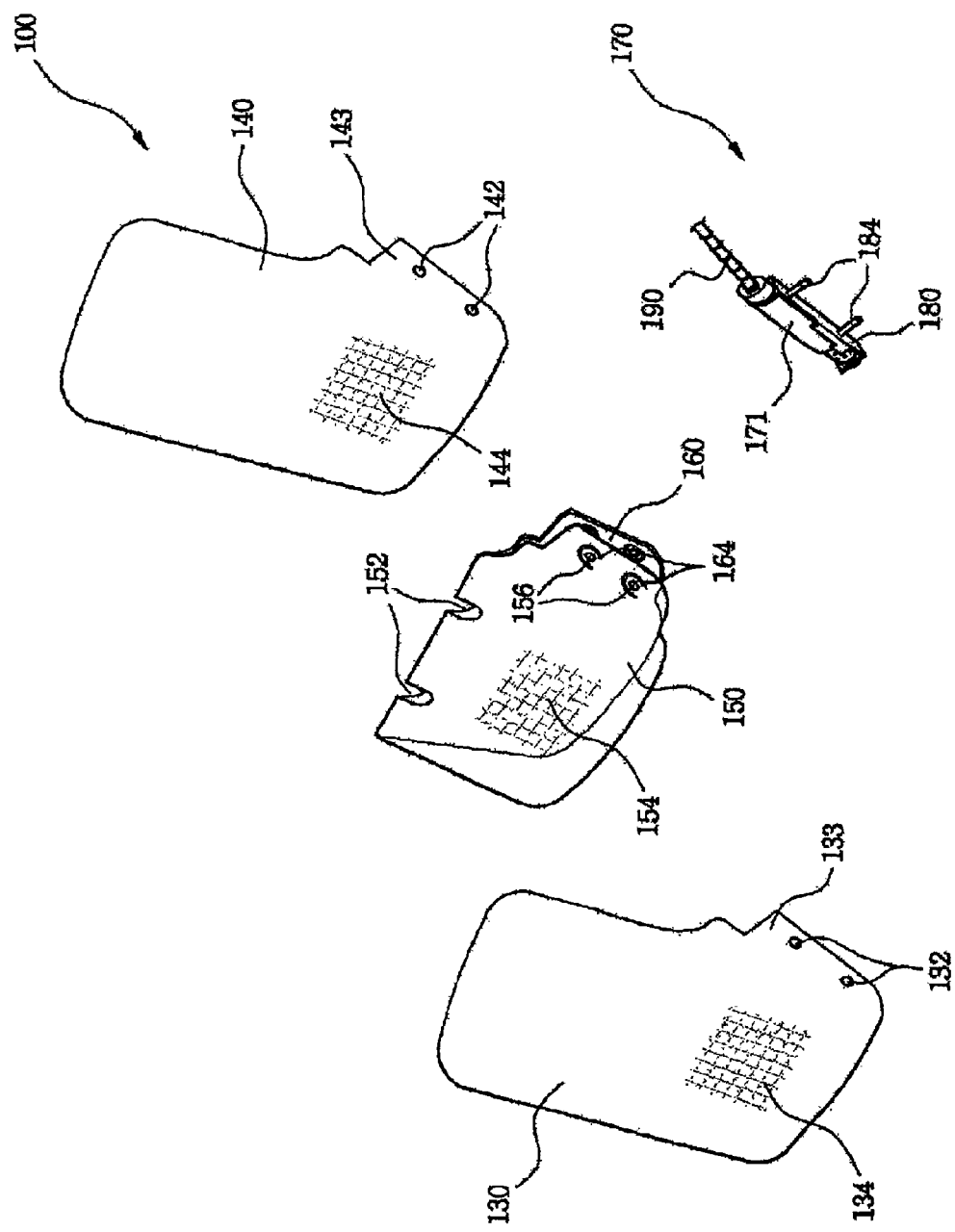
FIG. 7 shows a reinforcing pad mounted to an inner cushion pad in the side airbag for an automobile of FIG. 6.
Figure 8:
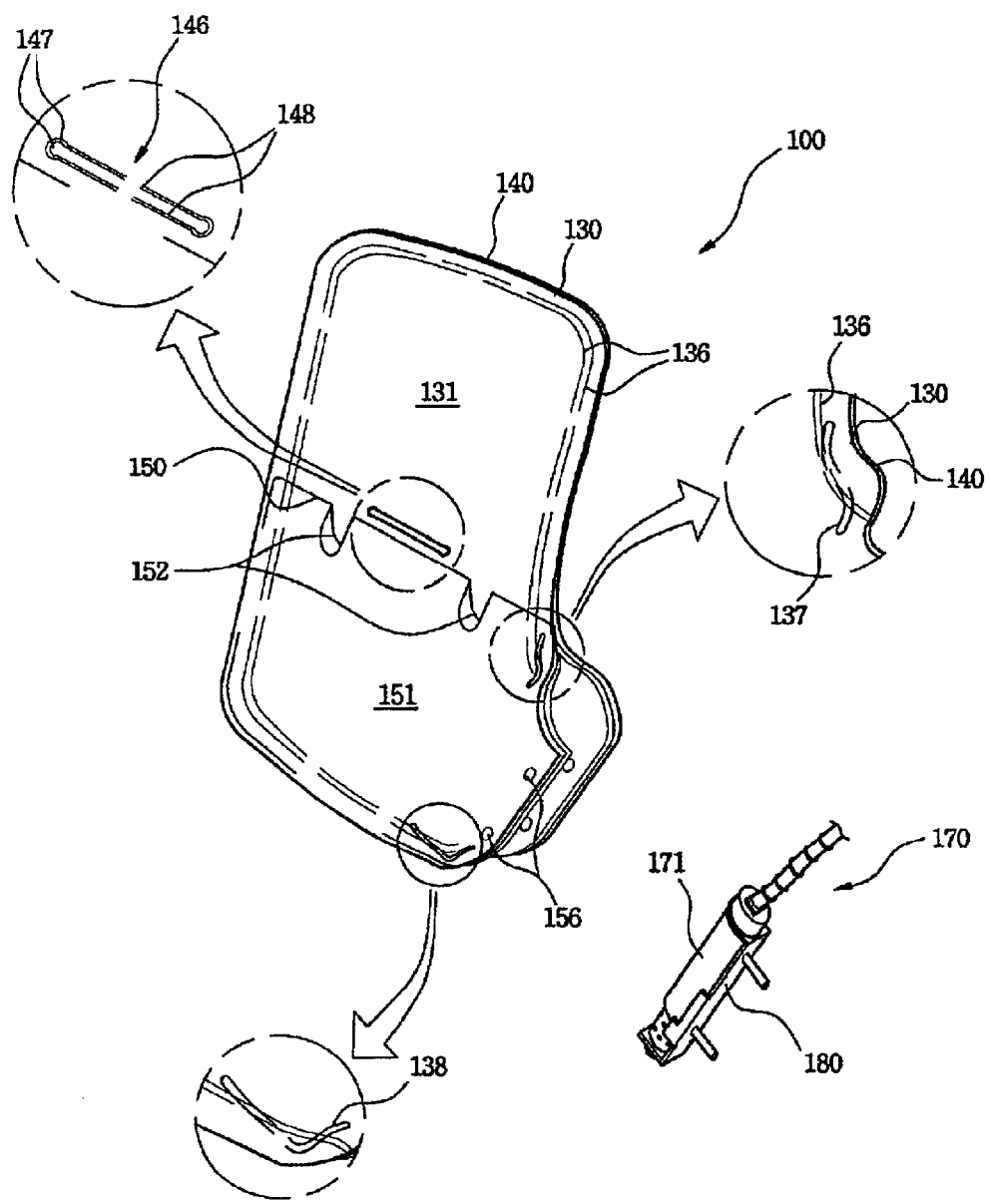
FIG. 8 shows first and second cushion pads and the inner cushion pad that are seamed to the side airbag for an automobile of FIG. 6.
Figure 9:
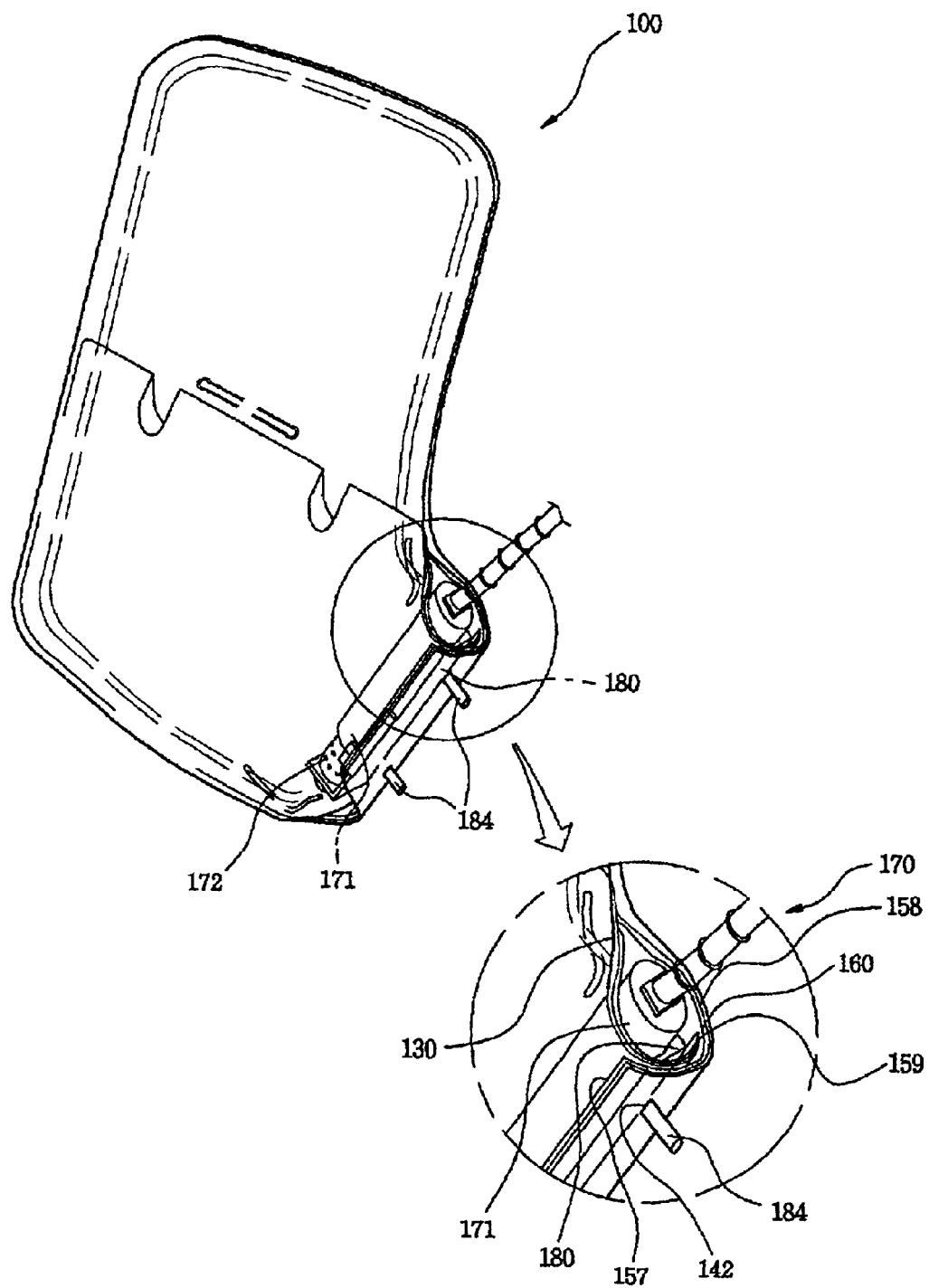
FIG. 9 shows an inflator and a reinforcing member are installed in the side airbag for an automobile of FIG. 6.
Figure 10:
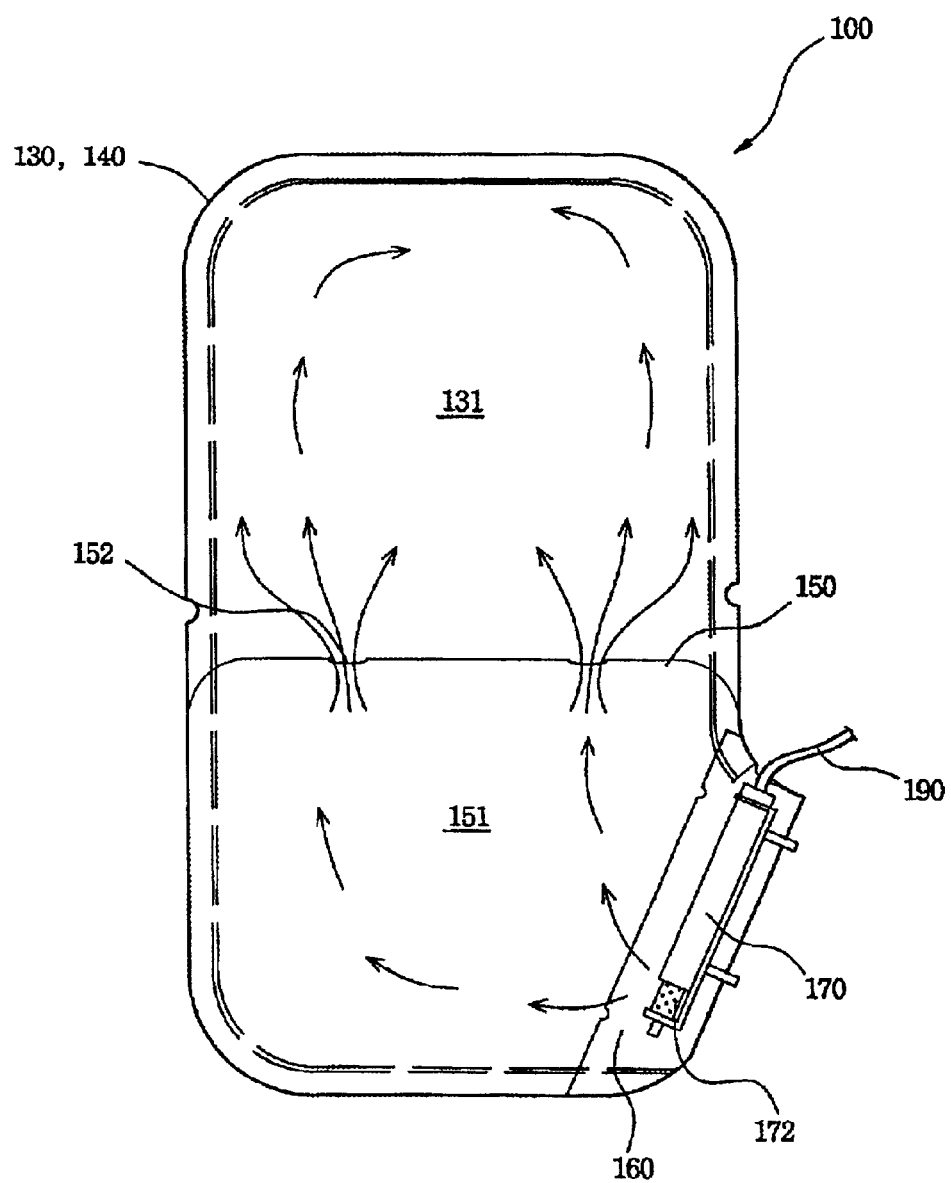
FIG. 10 shows the inflator operated to generate gas in the side airbag for an automobile of FIG. 6.

In the drawings, FIG. 6 is an exploded perspective view showing a side airbag for an automobile according to one embodiment of the present invention, FIG. 7 shows a reinforcing pad mounted to an inner cushion pad in the side airbag for an automobile, FIG. 8 shows a first and second cushion pads and the inner cushion pad are seamed in the side airbag for an automobile, FIG. 9 shows an inflator and a reinforcing member installed in the side airbag for an automobile, FIG. 10 shows that the inflator is operated to generate gas in the side airbag for an automobile of FIG. 6, and FIGS. 11a to 11g show the method of folding the side airbag for an automobile of FIG. 6.

As shown in FIGS. 6 and 7, the side airbag for an automobile according to the present invention includes an inflator module 170 mounted in the side of the chair back of the automobile to supply gas by explosion upon receiving a signal through an electric wire 190 when the automobile collides with something, and a first airbag module 100 which is inflated by the gas released from an inflator 171 of the inflator module 170 to protect the side of passengers.

The inflator module 170 includes the inflator 171 and a fixing member 180 having first and second mounting holes 182, 186 inserted and fixed to both ends of the inflator 171. At this time, the inflator 171 is connected to the electric wire connected to a sensor controller, not shown. The fixing member 180 also has screws 184, which protrude outward to pierce an insert hole 162 of a reinforcing pad 160, an insert hole 156 of an inner cushion pad 150, and insert holes 132, 142 of the first and second cushion pads 130, 140, all of which are described in detail below, and helps to fix the inflator module 170 to a fixed position on a seat.

The first airbag module 100 includes the first and second cushion pads 130, 140, the inner cushion pad 150 and the reinforcing pad 160.

At this time, the first and second cushion pads 130, 140 are rectangular cloth members using common texture for the airbag, and have extensions 133, 143 on which a plurality of insert holes 132, 142 are formed at one side. The inner cushion pad 150 is preferably made of same texture as the first and second cushion pads 130, 140, and positioned between the first and second cushion pads 10, 40 with being folded to a half its size to form a first chamber 151. The inner pad 150 has a plurality of first gas exhaust holes 152 opened upward, and has an inflator-mounting portion 158 corresponding to the extensions 133, 143 of the first and second cushion pads 130, 140. The reinforcing pad 160 has a shape corresponding to the inflator-mounting portion 158, and is put over and seamed with an inner side of the inflator-mounting portion 158. Preferably, the reinforcing pad 160 is made of cloth material with a coated surface. Such a reinforcing pad 160 acts to prevent the openings of the first and second cushion pads 130, 140 from burning due to heat caused by explosion of the inflator 171, and helping the screw 184 of the fixing member 180 to be securely fixed.

On the other hand, the first and second cushion pads 130, 140 and the inner cushion pad 150 are piled over, their warp threads 134, 144, 154 and woofs are oriented perpendicularly each other. More specifically, the warp threads of the first and second cushion pads 130, 140 are identically oriented to a longitudinal direction, while the warp threads of the inner cushion pad 150 are oriented to a horizontal direction. As described above, the first and second cushion pads 130, 140 and the inner cushion pad 150 are piled over with being weaving directions perpendicular to each other.

Therefore, when seaming the first and second cushion pads 130, 140 and the inner cushion pad 150 to form the first airbag module 100, the warp threads 134, 144, 154 and the woof of the piled pads 130, 140, 150 become relatively denser. It prohibits gas from leaking outside, compared with the airbag module configured without considering orientation of the warp threads and the woof of the piled pads.

In addition, since the inner cushion pad 150 has the warp threads oriented in a horizontal direction, the inner cushion pad 150 tends to make the gas, released from the inflator 171, flowing smooth to a horizontal direction. And, since upper portions of the first and second cushion pads 130, 140 have the warp threads oriented to a horizontal direction, it tends to make the gas, supplied from the first chamber 151 formed by the inner cushion pad 150, flowing smooth to a horizontal direction.

As described above, the side airbag of the present invention may induce the gas to flow smooth because the warp threads 134, 144, 154 of the first and second cushion pads 130, 140 and the inner cushion pad 150 are arranged to be perpendicular each other, and it may extend the bag pressure duration because the pads have relatively low permeability.

In addition, the first and second cushion pads 130, 140 and the inner cushion pad 150 may have surfaces which are coated partially or wholly, in order to regulate the time the bag is pressurized.

Now, a process of making the first airbag module 100 using the above-described pads 130, 140, 150, 160 is described.

At first, the reinforcing pads 160 of the first airbag module 100 are positioned to an inner side of the inflator-mounting portion 158 of the inner cushion pad 150, and then combined with the inner cushion pad 150 by corresponding the insert holes 156, 162 and forming a circular double seam line 164 around the insert holes 156, 62. After that, the inner cushion pad 150 is interposed between the first and second cushion pads 130, 140.

As shown in FIG. 8, such a first airbag module 100 includes a seam line 136 for sealing the gas supplied from the inflator 171 and filled up in the first and second chambers 151, 131 by seeming the first and second cushion pads 130, 140 and the inner cushion pad 150 to open the inflator-mounting portion 158 with them being piled.

At this time, the inner cushion pad 150 and the first and second cushion pads 130, 140 of the first airbag module 100 are piled with their lower ends coinciding and they are seamed along the seam line 136 to open the inflator-mounting portion 158. Such a first airbag module 100 seamed with the seam line 136 may obtain the first chamber 151 and the second chamber 131 partitioned by the inner cushion pad 150.

Also, both ends of the seam line 136 are seamed with first and second reinforcing lines 137, 138 formed in a transformed oval shape. This may prevent the cushion pads 130, 140, 150 from being broken due to gas pressure while the gas is filled up in the first and second chambers 151, 131. The first and second reinforcing lines 137, 138 are preferably formed to deviate from the sewing direction of the seam line 136.

In addition, the first airbag module 100 includes a cushion seam line 146 for seaming the center of the first and second cushion pads 130, 140 in order to prevent the first and second cushion pads 130, 140 from being excessively inflated when the gas is supplied in the first and second chambers 151, 131. At this time, the cushion seam line 146 has circular portions 147 formed in a semicircle at both ends thereof and a straight portion (148) to connect the circular portions (147).

Besides, the first gas exhaust holes 152 of the inner cushion pad 150 preferably have a diameter in the range of 15 mm ~40 mm so that the first airbag module 100 may be developed within $1/1000 \sim 4/1000$ second. Such first gas exhaust holes 152 are preferably formed in a circular or oval shape, considering the amount of gas passing through them. The seam line 136 and the cushion seam line 146 are preferably formed in two lines.

FIG. 9 is for illustrating the method of installing the inflator module 170.

The inflator module 170 in which the inflator 171 is combined with the fixing member 180 is positioned between the inner sides of the reinforcing pads 160 combined to the inflator-mounting portion 158. At this time, the inflator 171 is arranged so that a nozzle 172 is positioned below the inflator-mounting portion 158.

And, end portions 157, 159 of the piled pads are folded to overlap each other so as to wrap a rear portion of the fixing member 180, and the screws 184 of the fixing member 180 are then protruded outward through each insert hole 142. The protruded screw 184 is screwed with a bolt to a fixed position of a seat, not shown, so as to fix the first airbag module 100 and the inflator module 170 to the seat.

Hereinafter, operation and effect of the present invention is described in detail.

As shown in FIG. 10, when an automobile is hit at its side, the not-shown sensor controller detects the collision and transmits an electric signal to the inflator module 170 through the electric wire 190. The inflator module 170 then generates gas at the nozzle 172 arranged below according to operation of an explosion release plug.

The gas is injected into the first chamber 151 to exert pressure to the inner cushion pad 150, increasing the size of first chamber 151.

After that, the gas in the first chamber 151 flows into the second chamber 131 through a plurality of the first gas exhaust holes 152 due to the increase of inner pressure for a predetermined time. Such gas exerts pressure to the upper portions of the first and second cushion pads 130, 140 so as to increase the size of second chamber 131. And, when the inflator 171 slowly stops its operation, the first airbag 100 can be fully inflated.

On the other hand, the first chamber 151 is inflated to the height of the shoulder so as to protect the arms and the shoulder of the passenger at first, and the second chamber 131 is inflated to the height of the head so as to protect the face of the passenger.

In other words, the first and second chambers 151, 131, though inflated rapidly within $1/1000 \sim 4/1000$ second, may slightly delay the time gas is released from the first chamber 151 to the first gas exhaust hole 152 by the short time, so as to prevent the arms and the shoulder of passengers from being damaged.

Since the first and second cushion pads 130, 140 and the inner cushion pad 150 are wholly made entirely of the texture through which the gas leakage is relatively low, it may prevent the first and second cushion pads 130, 140 and the inner cushion pad 150 from bursting while the first airbag module 100 is rapidly inflated.

Moreover, because the first and second cushion pads 130, 140 and the inner cushion pad 150 are weaved in perpendicular directions, the gas leakage may be minimized.

The first airbag module 100 of the present invention is folded step by step according to the below explanation, though there is no set size or angle.

Figure 11A:
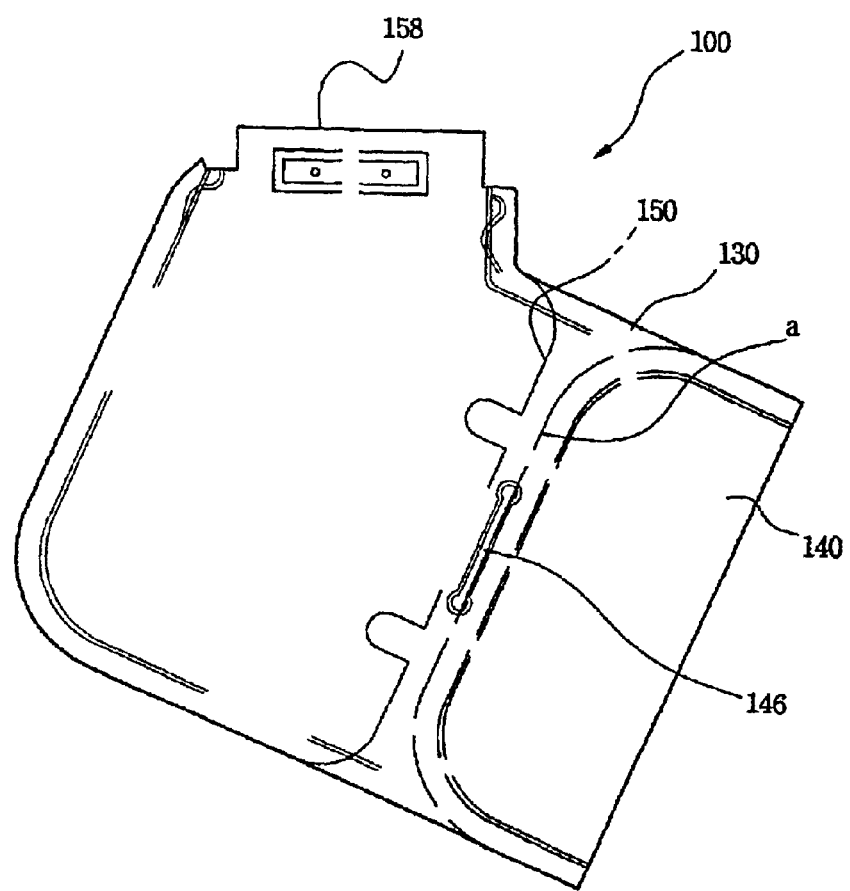
FIGS. 11a to 11g shows the method of folding the side airbag for an automobile of FIG. 6, sequentially.

As shown in FIG. 11a, when putting the first airbag module 100 on a worktable, the inflator-mounting portion 158 is positioned upward.

After that, a worker or an automatic installation folds the first and second cushion pads 130, 140 positioned opposite the inner cushion pad 150 so that ends (a) of the first and second cushion pads 130, 140 reach near the cushion seam line 146.

Figure 11B:
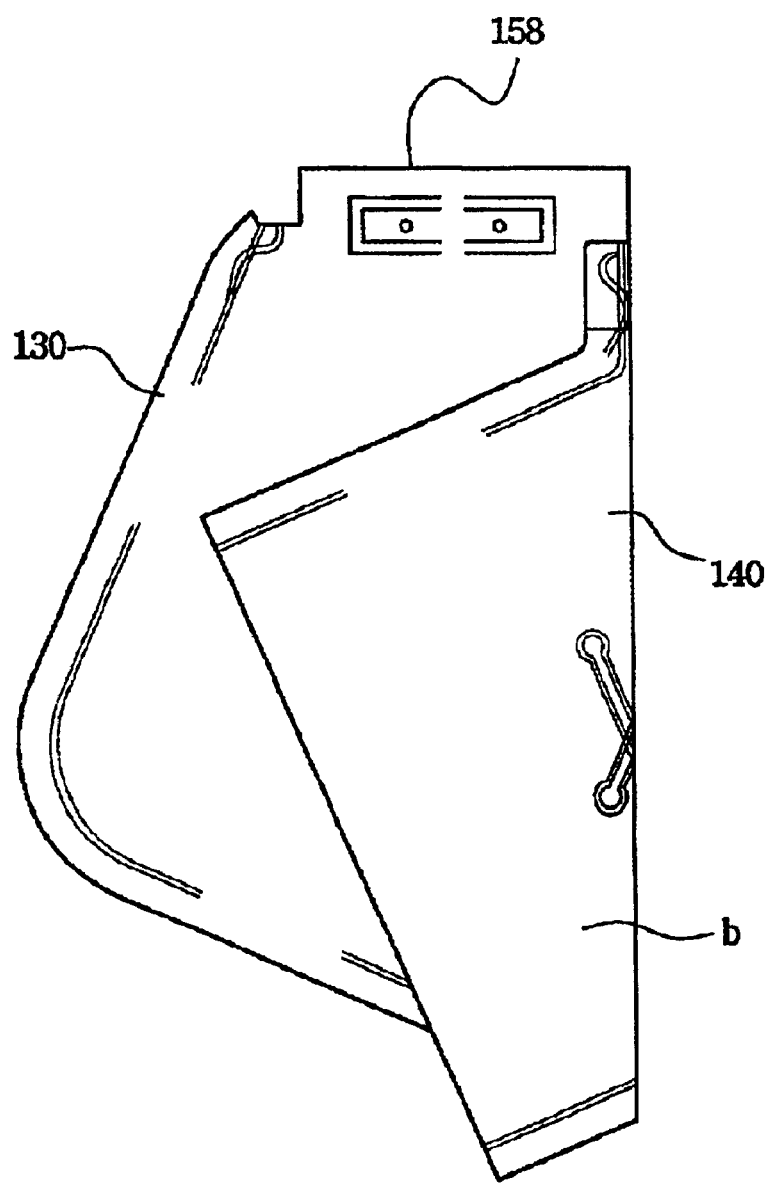

As shown in FIG. 11b, a right portion (b) of the folded first and second cushion pads 130, 140 is folded to the left so that an upper side of the inflator-mounting portion 158 becomes perpendicular to the right side of the right portion (b).

Of course, that the upper side of the inflator-mounting portion 158 is perpendicular to the right side of the right portion (b) is not absolutely necessary, and all terms representing a criterion among the terms adopted below are also used in a relative manner.

Figure 11C:
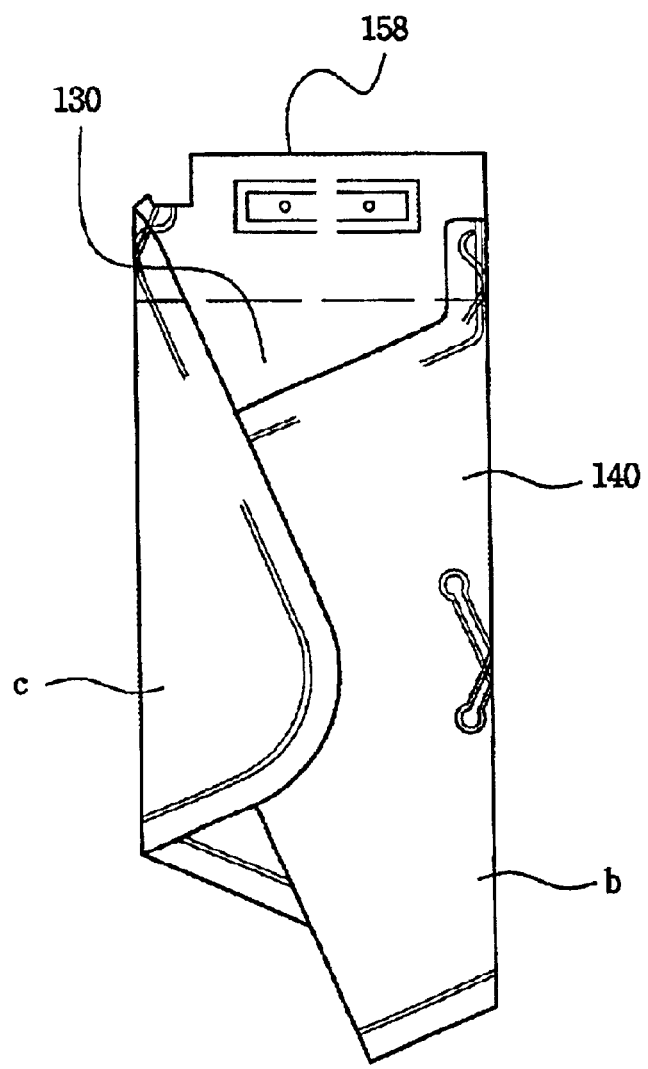

As shown in FIG. 11c, a left portion (c) of the folded first and second cushion pads 130, 140 is folded to the right to be partially piled with the right portion (b), and the upper side of the inflator-mounting portion 158 becomes perpendicular to the left side of the left portion (c).

Figure 11D:
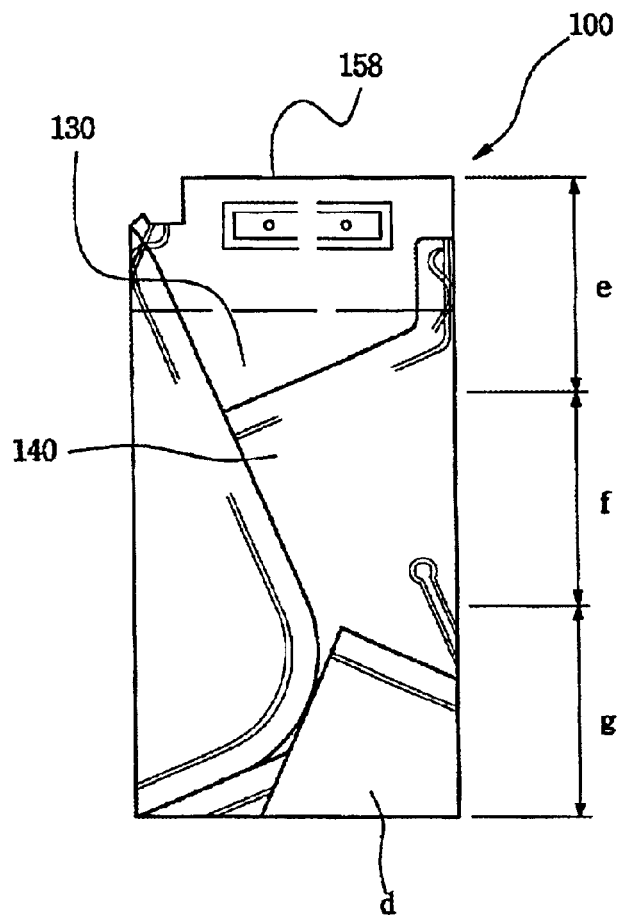

As shown in FIG. 11d, a lower portion (d) of the folded first and second cushion pads 130, 140 is folded upward so that the lower side of the lower portion (d) becomes perpendicular to the upper side of the inflator-mounting portion 158. In this case, the folded first airbag module 100 has a rectangular shape.

Also, the first airbag module 100 folded in a rectangular shape is then approximately partitioned into three sections (e, f, g).

Figure 11E:
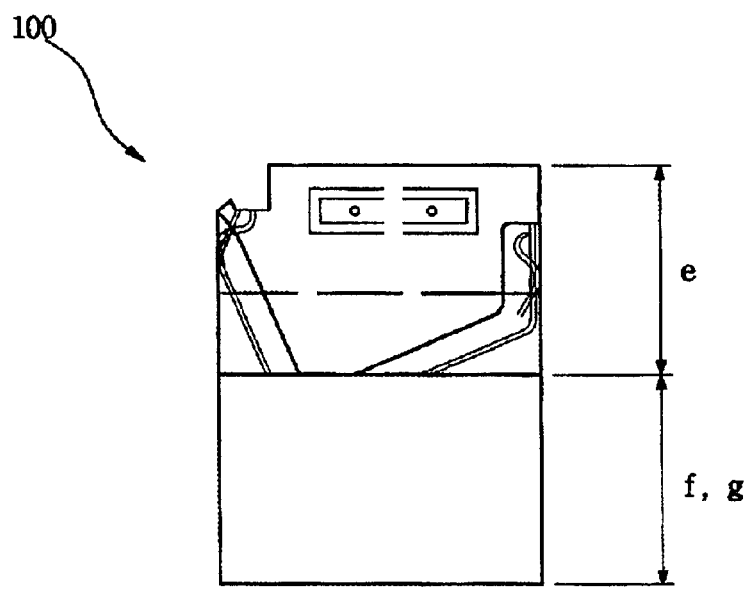
Figure 11F:
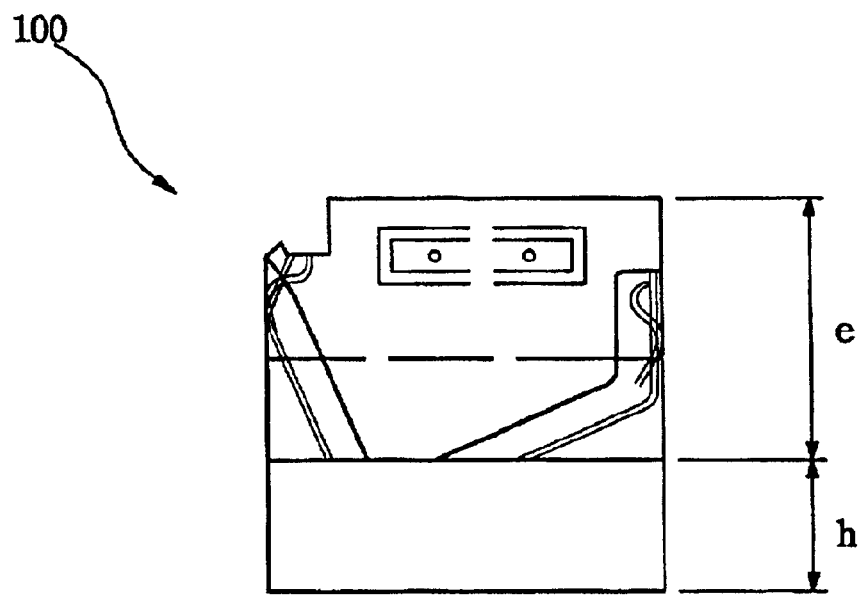

As shown in FIGS. 11e and 11f, the first airbag module 100 is folded so that the lower section (g) and the middle section (f) may be piled up.

Also, the first airbag module 100 may obtain a half section (h) by folding the piled middle and lower sections (f, g) in half.

Figure 11G:
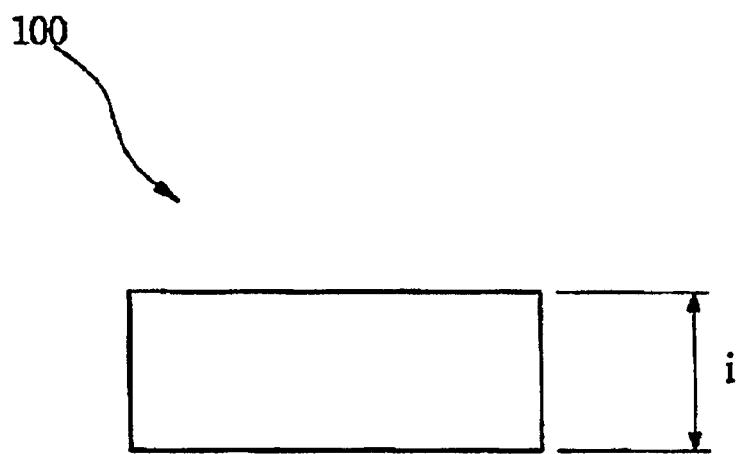

After that, as shown in FIG. 11g, the first airbag module 100 may obtain a final folded section (i) by folding the half section (h) upward twice.

Such a first airbag module 100 may be developed in reverse order to the folding process according to actuation of the inflator without eccentricity. At this time, the first airbag module 100 may protect a driver and passengers seated on the seat by regulating the bag gas pressure duration time and guiding stable development of the pads since the cushion pads are piled with perpendicular weaving directions or have the coated surface.

Second Embodiment

A side airbag for an automobile and its folding method described in this embodiment are or identical to the first embodiment except that a third cushion pad has a tear seam at its center, and a previously-sawed fourth cushion pad is positioned inside the third cushion pad so as to develop the third and fourth cushion pads gradually.

Therefore, in FIGS. 6 to 15, identical or corresponding elements have same or similar reference numerals and are not described here in detail.

Figure 12:
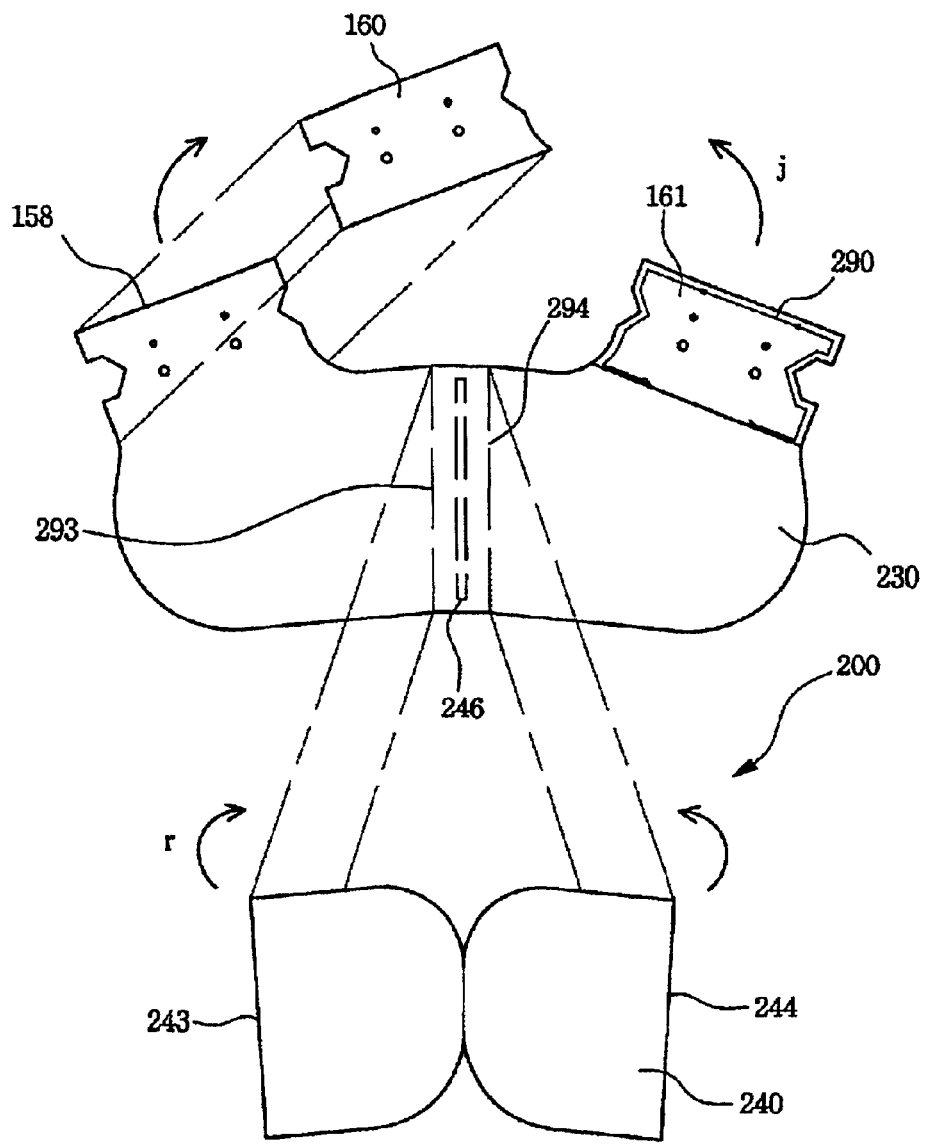
FIG. 12 is an exploded plane view illustrating the configuration of a side airbag for an automobile according to the second embodiment of the present invention.
Figure 13:
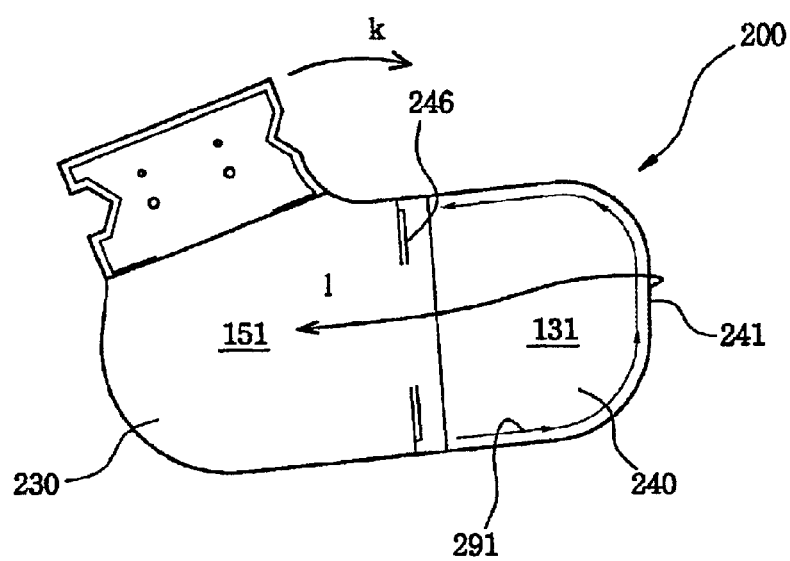
FIGS. 13 to 15 are plane views illustrating the method of folding the side airbag for an automobile shown in FIG. 12.
Figure 14:
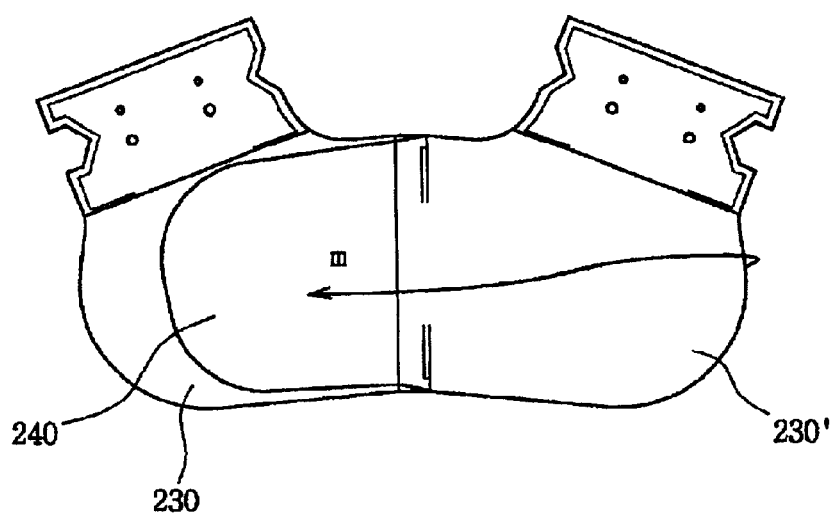
Figure 15:
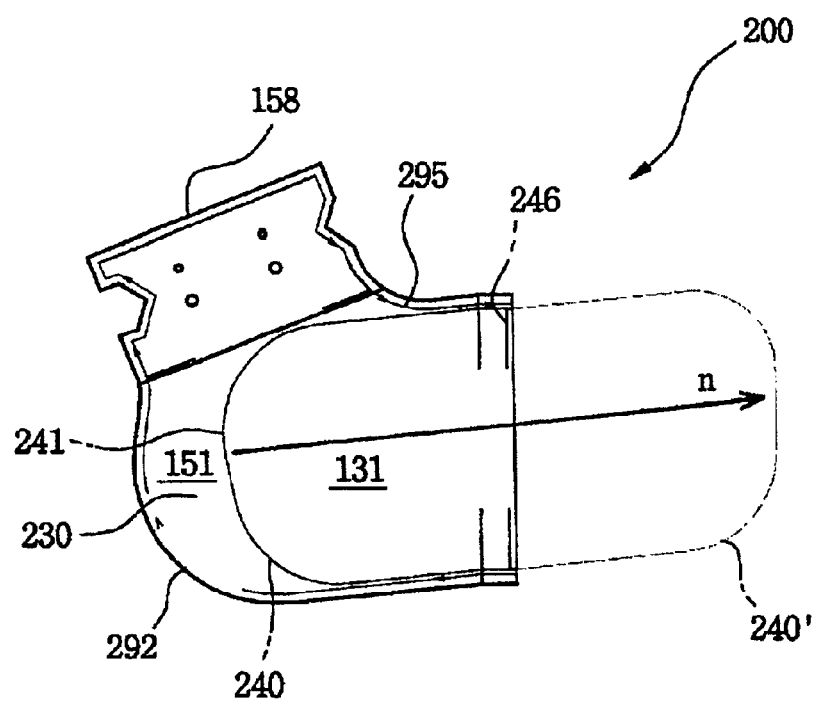

In the figures, FIG. 12 is an exploded plane view illustrating the configuration of the side airbag for an automobile according to the second embodiment of the present invention, and FIGS. 13 to 15 are plane views for illustrating the method of folding the side airbag for an automobile.

As shown in FIG. 12, a second airbag module 200 of the present invention includes reinforcing pads 160, 161, the third cushion pad 230 and the fourth cushion pad 240, which is relatively simple without the inner cushion pad of the first embodiment.

The first cushion pad 230 is a member forming the first chamber, and has size and shape corresponding to the thorax portion of the airbag. Such a third cushion pad 230 has two inflator-mounting portions 158 at both upper sides, and a tear seam 246 at its center. The tear seam 246 has a length slightly shorter that the vertical width of the third cushion pad 230, and is breakable due to a predetermined load so as to affect the making of a predetermined space between broken lines of the tear seam 246.

The reinforcing pads 160, 161 have a shape corresponding to the inflator-mounting portion 158 of the third cushion pad 230, and seamed to the inflator-mounting portion 158 with a seam line 290.

The fourth cushion pad 240 is a member forming the second chamber, and has a size and shape corresponding to the head portion of the airbag when being folded in opposite directions (r) along a center line. Both ends 243, 244 of the fourth cushion pad 240 are seamed to combining lines 293, 294 respectively, marked at a center of the third cushion pad 230.

Then, in folding the third cushion pad 230 again to opposite directions (j), the second airbag module 200 has a shape shown in FIG. 13.

As shown in FIG. 13, the fourth cushion pad 240 of the second airbag module 200 is arranged on the right and the third cushion pad 230 piled in two pieces is arranged on the left. At this time, the tear seam 246 is positioned in the center of the second airbag module 200 with being folded in half inside the fourth cushion pad 240.

A worker makes a seam line 291 at the circumference of the fourth cushion pad 240 so as to form the second chamber 131 in the fourth cushion pad 240. After that, the worker seizes a right end 241 of the seamed fourth cushion pad 240, and folds it in a direction (l) toward the third cushion pad 230 in which the first chamber 151 would be formed. Again, the worker pulls a backward pad of the third cushion pads 230 to the right direction (k) so as to spread the third cushion pad 230 out.

FIG. 14 shows that the fourth cushion pad 240 previously seamed and folded is positioned to the left of the third cushion pads 230, 230'.

The worker pulls the third cushion pad 230' positioned on the right to the left (m) so that the third cushion pads 230, 230' may be piled on each other.

As shown in FIG. 15, the worker seams the piled third cushion pad 230 along the seam lines 292, 295 so as to open the inflator-mounting portion 158, so that the fourth cushion pad 240 may be positioned inside the third cushion pad 230, 230', or the first chamber 151.

The above second airbag module 200 of the present invention is folded according to the manner as explained above with reference to FIGS. 11a to 11g.

Seeing the operating method of the second airbag module 200, when an inflator, not shown, installed to the inflator-mounting portion 158 releases gas to the first chamber 151, the third cushion pad 230 is inflated within 10 ms (1 ms=$\frac{1}{1000}$ second) to form a thorax portion of the airbag, and the tear seam 246 is broken due to the inner pressure of the first chamber 151.

After that, the fourth cushion pad 240 positioned inside the first chamber 151 is pierced through the broken tear seam 246 and at the same time punched out to a direction (n) shown in FIG. 15. Such a fourth cushion pad 240 is inflated within 20 ms ~25 ms due to the gas filled in the second chamber 131, and then forms a head portion of the airbag decreasing the interaction during the inflation.

Because the fourth cushion pad 240, which is a head portion, is seamed in advance to be folded in the third cushion pad 230, such a second airbag module 200 may gradually develop the thorax portion and the head portion and dramatically decrease the bag rotation, which may be easily caused in developing the conventional airbag.

Third Embodiment

A side airbag for an automobile and its folding method are identical to the foregoing embodiment except that a tube-type tether is positioned between the first and second chamber so that gas may be exhaled at the center of the cushion.

Therefore, in FIGS. 6 to 18, identical or corresponding elements having the same or similar reference numerals and are not described here in detail.

Figure 16:
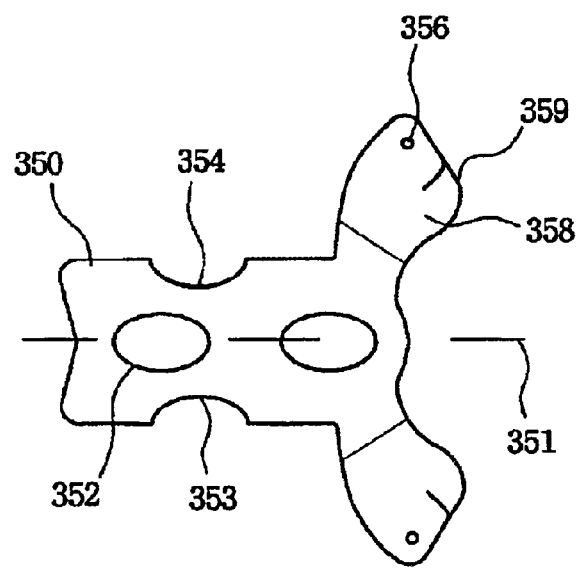
FIG. 16 is a plane view illustrating main configurations of a side airbag for an automobile according to the third embodiment of the present invention.
Figure 17:
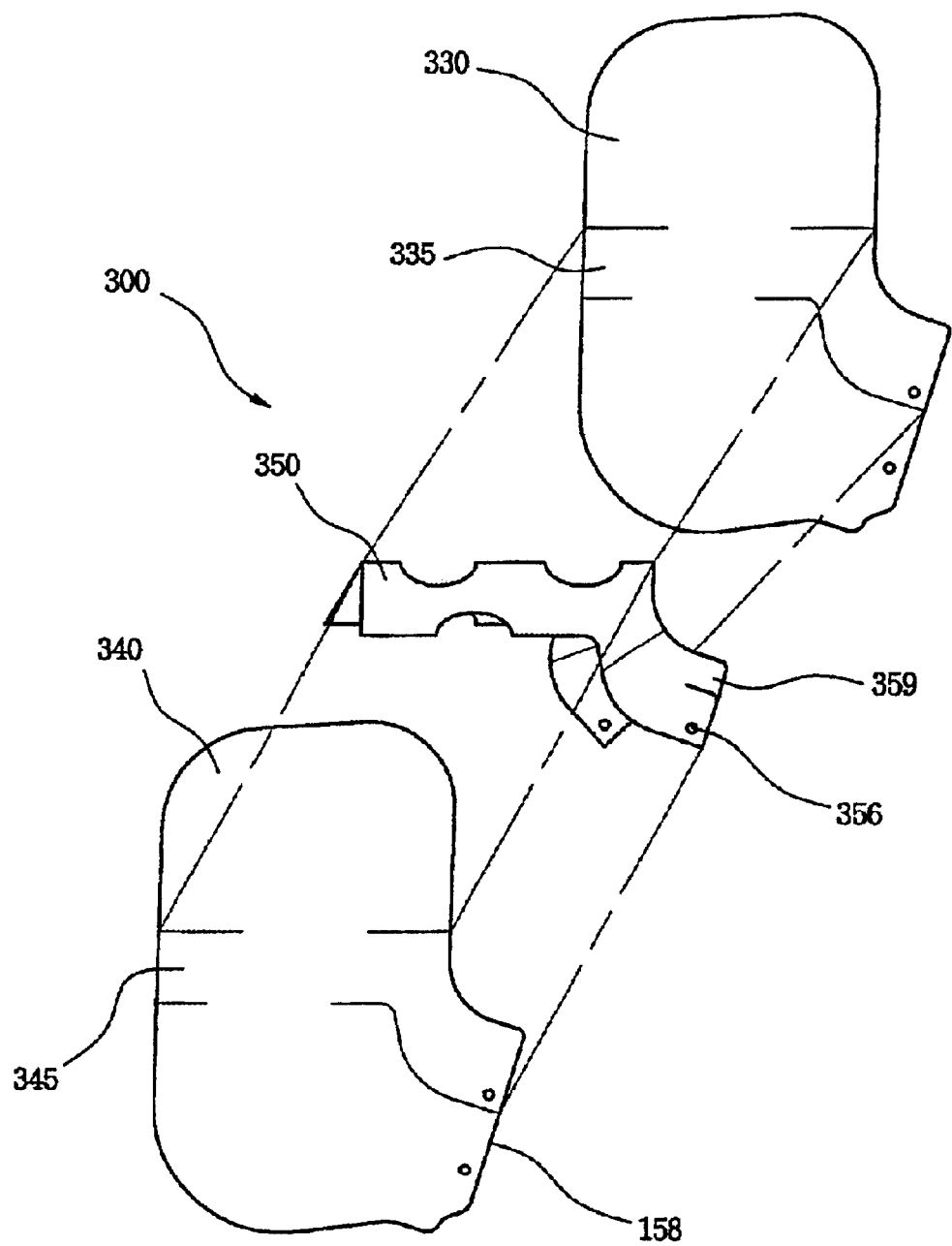
FIG. 17 is a perspective view illustrating the method of assembling the side airbag for an automobile by using the main configurations shown in FIG. 16.
Figure 18:
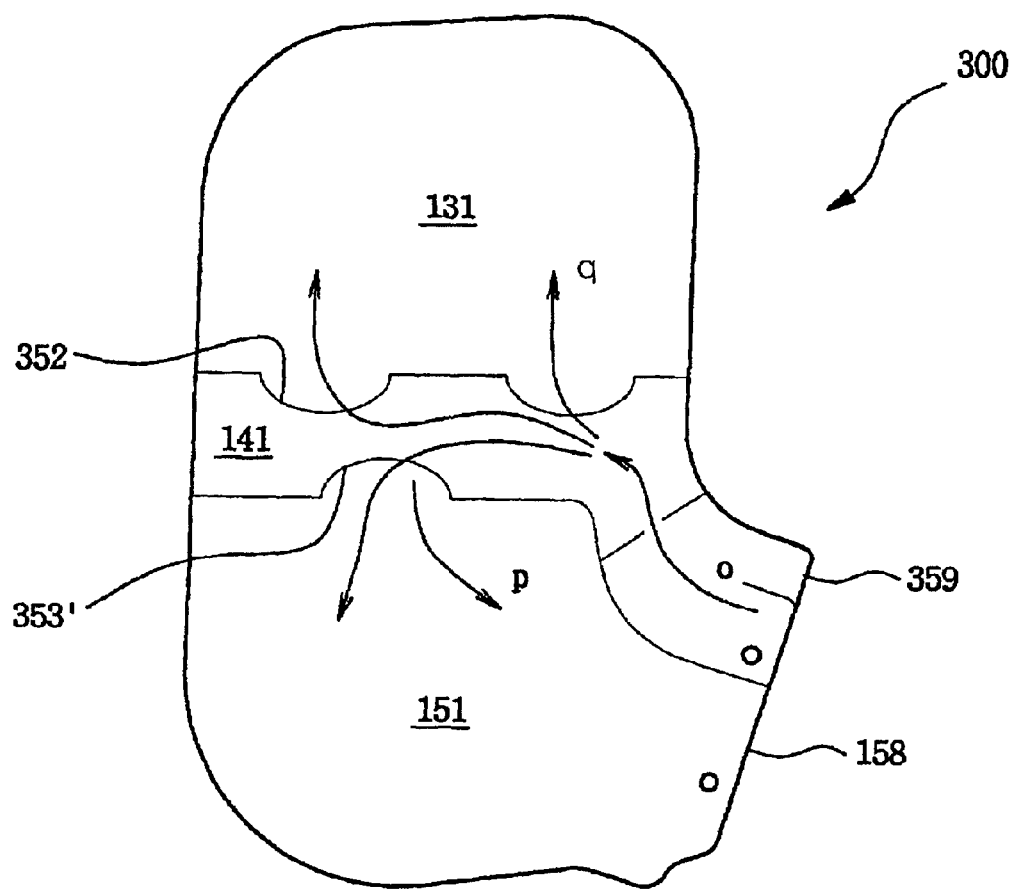
FIG. 18 illustrates how the side airbag of FIG. 7 operates.

In the figures, FIG. 16 is a plane view illustrating the main configurations of a side airbag for an automobile according to the third embodiment of the present invention, FIG. 17 is a perspective view illustrating the method of assembling the side airbag for an automobile by using the main configurations, and FIG. 18 is for illustrates how the side airbag operates.

As shown in FIG. 16, the third airbag module 300 includes a tube-type tether 350.

The tube-type tether 350 has two second gas exhaust holes 352 formed on a folding line 351, and semi-circular exhaust hole portions 353, 354 formed at upper and lower sides thereof so as to form a third gas exhaust hole when folding the tether along the folding line 351.

In addition, the tube-type tether 350 has passages 359 formed above and below its right side. When being seamed to the fifth and sixth cushion pads, the passage 359 acts as a kind of supply pipe through which the gas from the inflator may pass. Such a passage 359 is seamed with reinforcing pads 358 at both ends, and has a combining hole 356 into which the screw of the inflator may be inserted.

As shown in FIG. 17, the tube-type tether 350 is folded and put on tether-attaching portions 335, 345 of the fifth and sixth cushion pads 330, 340.

Of course, the tube-type tether 350 is weaved in a direction perpendicular to the fifth and sixth cushion pads 330, 340 and therefore prevents the inner gas from leaking outside.

Such a tube-type tether 350 is combined with the fifth and sixth cushion pads 330, 340 by seaming all borders except an upper side to the tether-attaching portions 335, 345.

After that, the fifth and sixth cushion pads 330, 340 are seamed except the inflator-mounting portion 158, making the third airbag module 300.

Of course, the third airbag module 300 is folded according to the folding method explained in the first embodiment, and has the gas flow as follows when the airbag is developed.

As shown in FIG. 18, the gas flow of the third airbag module 300 starts from the inflator, not shown, installed to the inflator-mounting portion 158. At this time, the inflator has a nozzle positioned above the inflator-mounting portion 158. Therefore, the gas released from the nozzle in operating the inflator advances (o) inside the center chamber 141 through the passage 359 of the tube-type tether 350 so as to inflate the tube-type tether 350. In addition, the gas in the center chamber 141 is supplied (p, q) inside the first and second chambers 151, 131, respectively, through the second and third gas exhaust holes 352, 353' so as to, therefore, inflate the first and second chambers 151, 131.

Such a third airbag module 300 may reduce bag rotation because gas exhaled from the center chamber 141 is formed at the center by the tube-type tether 350 into the first and second chambers 151, 131.

Particularly, the third airbag module 300 may regulate the developing manner of the airbag by adjusting size of the gas exhaust holes 352, 353' formed at the tube-type tether 350. In addition, because supplying gas through the tube-type tether 350, the third airbag module 300 may maintain the gas pressure for a longer time and tends to decrease interaction during inflation.

Therefore, as described above, the side airbag for an automobile according to the present invention is advantageous in operation efficiency owing to low permeability and relatively long gas pressure duration time because the cushion pads and the tube-type pads are weaved in perpendicular directions.

In addition, the side airbag for an automobile according to the present invention has an advantage of minimizing interaction during inflation because of the gradual inflation of the second chamber after the first chamber is inflated, or by supplying the gas from the center chamber so that the first and second chamber are inflated at nearly same time.

Moreover, because the second chamber previously seamed and positioned in the first chamber is gradually expanded to be punched out through the tear seam and then fully inflated, the side airbag for an automobile according to the present invention may reduce the bag rotation, which easily happens in the conventional side airbags, so it is more useful and effective in protecting the face of passengers.

Besides, the cushion pads used in the side airbag of the present invention require a small amount of material, they are easily seamed and folded, reducing costs.

The side airbag for an automobile and its folding method according to the present invention have been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A side airbag for an automobile installed to the side of a chair back of an automobile and having an inflator which supplies gas by explosion upon receiving of a signal through an electric wire when the automobile crashes, the side airbag comprising:

a first airbag module including first and second cushion pads having extensions with a plurality of insert holes on one side and combined with each other to form a second chamber for filling gas therein, and an inner cushion pad which is folded in a half to form a first chamber between the first and second cushion pads and has a plurality of first gas exhaust holes formed upward thereon and an inflator-mounting portion which is piled with the extensions; and an inflator module including a fixing member having first and second mounting holes into which both sides of the inflator are inserted, the fixing member fixing the first airbag module to the inside of the side of the chair back by inserting outwardly protruded screws thereof into the insert holes of the first and second cushion pads and into an insert hole of the inner cushion pad, wherein the first and second cushion pads and the inner cushion pad are stacked with each warp thread being arranged perpendicular to each other so as to prevent gas from flowing out of the inner side of the first and second cushion pads when the inner cushion pad is inflated.

2. The side airbag for an automobile as claimed in claim 1, wherein the first airbag module is seamed to open the inflator-mounting portion when the first and second cushion pads are piled with the inner cushion pad so that the first airbag module has a seam line sealing the gas supplied from the inflator and supplied in the first and second chambers.

3. The side airbag for an automobile as claimed in claim 2, wherein the seam line is formed in two lines.

4. The side airbag for an automobile as claimed in claim 2, wherein the first airbag module further includes first and second reinforcing lines having an oval shape transformed at an end of the seam line so as to prevent the first and second cushion pads and the inner cushion pad from being torn.

5. The side airbag for an automobile as claimed in claim 1, wherein the first and second cushion pads include a cushion seam line for seaming a center of the first and second cushion pads in order to prevent the first and second chambers from being excessively inflated with the supplied gas.

6. The side airbag for an automobile as claimed in claim 5, wherein the cushion seam line has circular portions formed in a semicircular shape at both ends thereof and a straight portion to connect the circular portions.

7. The side airbag for an automobile as claimed in claim 5, wherein the cushion seam line are formed in two lines.

8. The side airbag for an automobile as claimed in claim 1, wherein the warp threads of the first and second cushion pads are identically oriented to a longitudinal direction, while the warp thread of the inner cushion pad is oriented to a horizontal direction.

9. The side airbag for an automobile as claimed in claim 1, further comprising a plurality of reinforcing pads seamed to an inner side of the inflator-mounting portion of the inner cushion pad each reinforcing pad having a thread hole into which the screws of the fixing member is inserted.

10. The side airbag for an automobile as claimed in claim 9, wherein the reinforcing pad is combined by a double seam line, which is formed in a circular shape around the insert hole of the inner cushion pad.

11. The side airbag for an automobile as claimed in claim 1, wherein the first gas exhaust hole of the inner cushion pad has a diameter of 15 mm–40 mm so that the first airbag module is fully developed within $1/1000$–$4/1000$ second.

* * * * *